Figure 1:
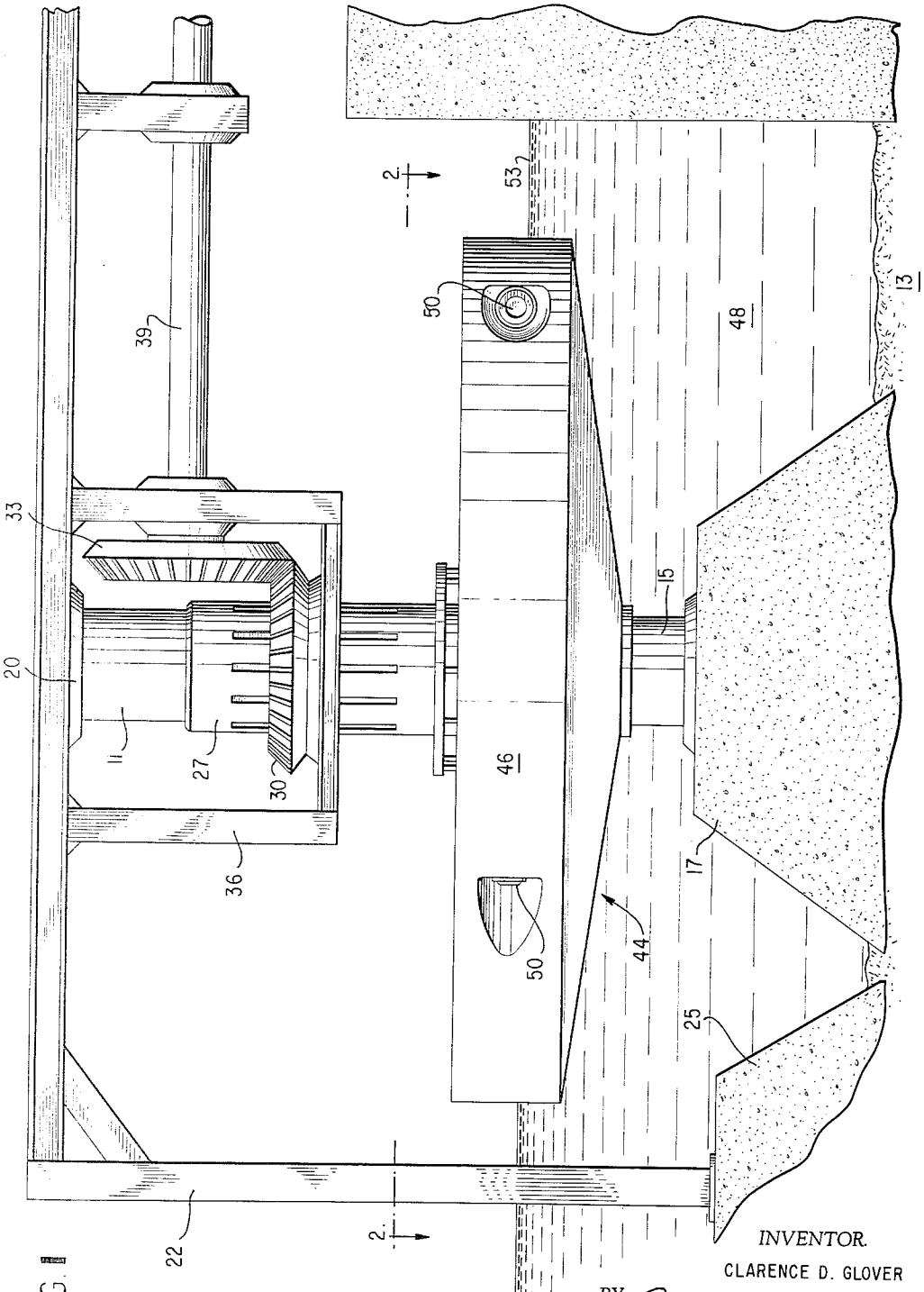

April 5, 1966 C. D. GLOVER 3,243,953
PLURAL ENGINE POWER PLANT
Filed Aug. 3, 1962 2 Sheets-Sheet 1

INVENTOR.
CLARENCE D. GLOVER
BY [signature]
ATTORNEY

April 5, 1966 C. D. GLOVER 3,243,953
PLURAL ENGINE POWER PLANT
Filed Aug. 3, 1962 2 Sheets-Sheet 2

INVENTOR.
CLARENCE D. GLOVER
BY Adams, Forward
& McLean
ATTORNEY

United States Patent Office 3,243,953
Patented Apr. 5, 1966

3,243,953
PLURAL ENGINE POWER PLANT
Clarence D. Glover, Tampa, Fla., assignor to Hydro-Centura Engineering, Inc., Gibsonton, Fla., a corporation of Florida
Filed Aug. 3, 1962, Ser. No. 214,674
4 Claims. (Cl. 60—12)

This invention is a novel power plant designed to multiply the effectiveness of the power sources used, especially sources of jet power. Industrial operations frequently are presented with the need to employ enormous amounts of force for moving machinery, for example, in electric generator power plants. The need for such concentrations of force, however, usually are not numerous enough for engines to provide this power to be made by mass production methods. The cost of such engines, therefore, frequently is much higher than would be the cost of the same amount of horsepower-producing facilities using smaller engines manufactured by assembly line techniques. Further, in order to provide for down-time, such power plants frequently install duplicate engine facilities, at, of course, double the capital investment, so that the flow of power will not be interrupted if one engine is shut down for repairs. In this invention, however, by providing a plurality of easily replaceable units, the "spare" to be kept on hand causes just a slight addition in capital outlay. Also, when conventional assemblages of small engines are made or when a large engine is required to make a large force expenditure at the sacrifice of speed, elaborate gearing is usually resorted to. Such gearing arrangements usually are expensive to install and lubricate as well as otherwise maintain.

This invention offers a unique solution to the problem of accumulating force from a plurality of relatively low horsepower engines, while reducing gearing to the bare minimum. This invention comprises a vertical power shaft of a horizontal wheel, the wheel being provided at or near its periphery with a plurality of wheel-moving engines. The engines, of course, are aligned to move the wheel in uni-direction and preferably the propulsion of the wheel is accomplished by a jet reaction, which eliminates the need for gear reducing mechanisms during the starting up of the power plant. The torque on the power shaft is the product of the radius of the wheel and the sum of the individual motive forces. The individual sources of motive force or engines are generally equal in their work output and are equally spaced around the periphery of the wheel to avoid any imbalance.

In a preferred situation, the power wheel may be designed to float in a pool or other body of water and to utilize water jets; however it is obvious that the power wheel may be provided with support wheels for use on dry land or in a building, and that the propulsion may be by air jet or by driving of the support wheels by a suitable power source, such as internal combustion engines, electric motors, etc. Water jet propulsion mechanisms, however, appear to have the advantage of providing the greatest horsepower-to-weight ratio available with mass produced components, while avoiding unnecessary bulk, while the water-borne feature eliminates a good deal of internal friction associated with other support instrumentalities. In each situation, however, the motive force is preferably applied at the outermost periphery of the wheel in order to develop maximum torque.

Figure 2:
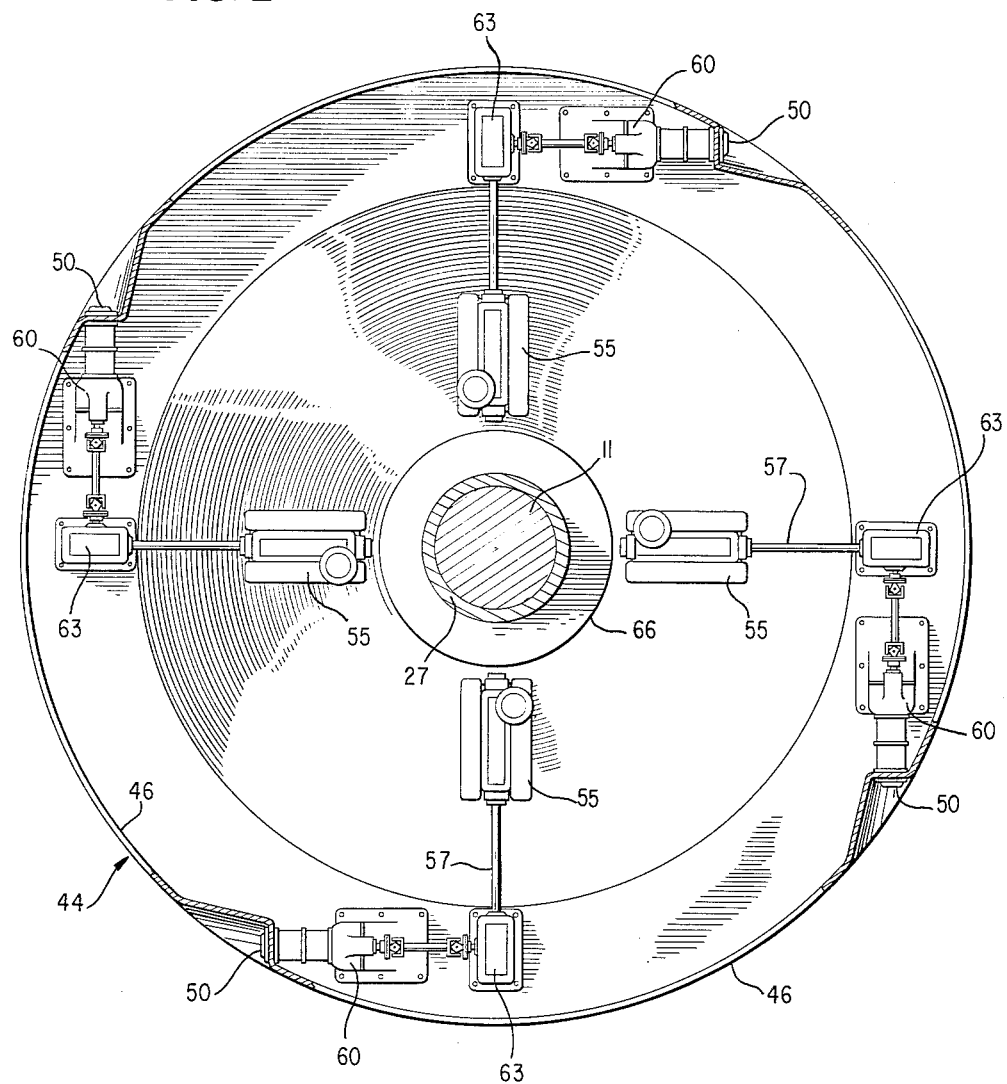

The invention will be better understood by reference to the accompanying drawings in which FIGURE 1 is a side view of an embodiment of the invention, and FIGURE 2 is a plan view of the apparatus along the line 2—2 of FIGURE 1.

The drawings show a vertical axle 11 which is held stationary, in this embodiment being affixed to the earth 13, at one end 15, by means of the concrete piling 17. The upper end 20 is held by the horizontal and vertical elements of the bracket 22 which in turn is also held firmly in the ground 13 by the piling 25. To the fixed axle 11, preferably near its upper end 20, is affixed a power transmission mechanism, in this embodiment the rotatable, vertically adjustable sleeve 27, the upper portion of which is keyed or splined to the miter gear 30 which is held in operative relation to the miter gear 33 by the bracket 36 which may be suspended from the horizontal member of bracket 22. Miter gear 33 transmits power to take-off rod 39, which also may be suspended from the bracket 22. The opposite end of take-off rod 39 is mechanically fixed to the machinery to be run. It is apparent that other types of transmission, such as V-belts, etc. may be conjoined to the sleeve 27 in place of the miter gears and take-off shaft.

In the embodiment shown, the wheel comprises a hull 44 having the outer bulkhead 46. The hull is firmly attached to the lower end of sleeve 27 and, of course, is of sufficient volume and made of material of a suitable weight so that the wheel floats in the pool of water 48. A bearing seal, not shown, made, for example, of rubber, may be affixed to the bottom of the hull 44 to prevent leakage. The pool of water may be artificial or may be a natural body of still or moving water. In the embodiment shown, the buoyancy of the hull 44 is such that the jet exhausts 50 are just above the water line 53.

Motive power for the wheel in the embodiment shown is provided by a plurality of internal combustion engines, 55, preferably diesel engines, placed equidistantly from each other within the hull 44. These engines operate the shafts 57 which in turn drive water impellers within the jet cylinders 60, employing, if necessary, a right angle gear box or other drive 63.

The cylinders 60 are arranged close to the bulkhead 46 and are provided with suitable means for ingesting jet fluid; ideally, the cylinders at their forward end have a bottom opening to the water. The water impellers within the cylinders serve to pull water into the forward end of the cylinder and pump it out at an effective speed through the jet exhausts 50. Preferably, as mentioned, the jet exhaust impinges on air above the water line 53 to improve the thrust obtainable by this particular type of jet engine. The hull 44 may comprise a double-wall structure suitable for internal storage of fuel for the engines, or other fuel or energy transmission systems may be provided for the engines. In the embodiment shown, a platform 66 attached to the sleeve 27 and/or the hull 44 is provided for access to the engines.

It can thus be seen that this invention provides a novel power plant in which relatively low-horsepower, mass-produced power units may be combined to give a plant capable of great force.

It is claimed:
1. A power plant comprising a buoyant hull in the form of a horizontal wheel supporting, near its periphery, a plurality of wheel-moving, water jet, reaction engines equally spaced around the periphery, about equal in work output and tangentially oriented to move the wheel in unidirection, each of said engines including an impeller mounted on said hull in a manner sufficient to pull in water from below the hull at the forward end of the engine and eject water from the rear of the engine, the bouyancy of said hull being sufficient to hold the rear of said engines above the water line, the impeller of each of said plurality of engines being connected by a drive shaft to an internal combustion engine mounted on said hull, a vertical axle for said wheel, and a vertical power shaft fixed to said wheel in concentric relation thereto the upper end of said power shaft being affixed to a power transmission mechanism.

2. The power plant of claim 1 in which the lower end of the axle is affixed to the ground.

3. The power plant of claim 1 in which the internal combustion engines are diesel engines.

4. The power plant of claim 1 in which the hull provides space for storage of fuel for said internal combustion engines.

References Cited by the Examiner

UNITED STATES PATENTS

| 2,709,895 | 6/1955 | Mount | 60—39.35 X |
| 3,070,954 | 6/1963 | Basso | 60—35.5 |

MARK NEWMAN, *Primary Examiner.*

ABRAM BLUM, *Examiner.*